July 4, 1961 E. S. LA RUE ET AL Re. 25,004

DETACHABLE FASTENER

Original Filed Aug. 27, 1954

INVENTORS
ELEANOR S. LARUE
FREDERICK GENE LARUE
BY Manfred H. Harrison
their ATTORNEY United States Patent Office Re. 25,004
Reissued July 4, 1961

25,004
DETACHABLE FASTENER

Eleanor S. La Rue and Frederick Gene La Rue, both of 67 Linden Lane, Mill Valley, Calif.; said Frederick Gene La Rue assignor to said Eleanor S. La Rue Original No. 2,874,433, dated Feb. 24, 1959, Ser. No. 452,492, Aug. 27, 1954. Application for reissue Aug. 12, 1960, Ser. No. 49,401
6 Claims. (Cl. 24—103)

Matter enclosed in heavy brackets [ ] appears in the original patent but forms no part of this reissue specification; matter printed in italics indicates the additions made by reissue.

The invention relates to the form and construction of detachable fastener elements and particularly to those embodying a pin arranged for passing through and attaching together one or more layers of fabric or the like, or for detachably securing to the fabric a button or similar article.

An object of the present invention is to provide a detachable fastener of the character described which is adaptable to a wide number and *various* types of applications and *which* may be made from various materials to afford both ornamentation and function and in various sizes to work with different types and thicknesses of material to be secured. For example, the fastener may be applied to garments and the like in a manner similar to the common straight or safety pin, may be used for applying buttons to garments, and may be adapted for a wide variety of other functions and applications, such as clasps, buckles or the like, wherever detachable fastener sections may be employed.

Another object of the present invention is to provide a fastener of the character above which may be quickly and easily applied to and removed from a garment without injury to the cloth of the garment, thereby facilitating and encouraging the frequent interchange of buttons and other ornaments, as, for example, on women's dresses, coats and suits so as to obtain desired ornamental effects.

A further object of the present invention is to provide a fastener of the character described which will be compact in form and will provide an improved support for and presentation of a button or the like.

Still another object of the invention is to provide a detachable fastener of the character described which may be economically manufactured in mass production and will be designed to provide a long and useful life.

Yet a further object of the present invention is to provide a detachable fastener of the character described which may be adapted for use in a covered button construction wherein the several parts, including a button form, may be quickly and easily assembled with a desired fabric covering for the button and applied to a garment.

The invention possesses other objects and features of advantage, some of which, with the foregoing, will be set forth in the following descriptions of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
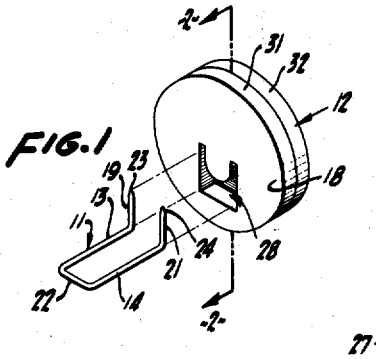
FIGURE 1 is a perspective view of the detachable fastener constructed in accordance with the present invention.

The fastener of the present invention consists, briefly, of a pair of detachable sections 11 and 12, the section 11 including a pair of spaced resilient wire legs 13 and 14, and the section 12 being formed with bores 16 and 17 opening to a side 18 thereof and dimensioned to slidably receive the legs 13 and 14, and as a special feature of the fastener, bores *16 and 17* are *angularly related relative to each other and* divergently tapered *and located inwardly* from the side 18 so as to resiliently deflect the legs 13 and 14 upon sliding of the legs into the bores on attachment of the sections. Preferably, the free end portions 19 and 21 of the legs 13 and 14 are angularly extended from the legs so as to place a torsional strain on the legs upon insertion of the ends into the divergent bores 16 and 17 and, for most applications at least, the end portions 19 and 21 should be bent to extend substantially perpendicular to the legs, as generally illustrated throughout the various forms in the drawings.

In the forms of the invention illustrated in FIGURES 1 to 4 and 6 and 7 of the drawing, the section 11 is formed of a substantially U-shaped wire providing the legs 13 and 14 in substantially parallel relation and terminating at one end in a transverse *graspable handle* connection portion 22. In this arrangement the opposite free ends 19 and 21 of the legs are bent to extend substantially perpendicular to the legs 13 and 14 and into parallel relation to each other. Also, to facilitate the insertion of the wire fastener section through material to be fastened, the [ends] *extremities* 23 and 24 of the *end* portions 19 and 21 are desirably pointed.

Figure 3:
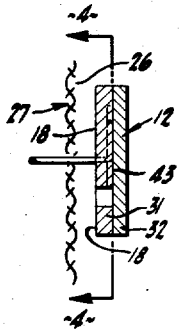
FIGURE 3 is a cross-sectional view of the fastener.

The fastener section 12 may be composed, as here shown, of a disk-like body having a substantially flat side 18 which in the operative positioning of the device, as illustrated in FIGURE 3, will be positioned flatly against one side 26 of a fabric layer 27 secured by the fastener. The side 18 of the body *section* 12 is formed with an opening 28 which is dimensioned to receive the free end portions 19 and 21 of the fastener section 11, and the bores 16 and 17 formed internally in the body *section* 12 have their *inner* ends terminated at and in communication with the opening 28. In keeping with the perpendicular offsetting of the wire ends 19 and 21, the bores 16 and 17 are preferably arranged in a plane substantially perpendicular to the opening 28—that is, substantially parallel to *and spaced from* the flat side 18. To facilitate manufacture, the section 12 may be laminated out of two pieces 31 and 32. In this arrangement the piece 31 may have the opening 28 cut through it and the bores 16 and 17 milled in its inside face laminated to the piece 32.

Figure 2:
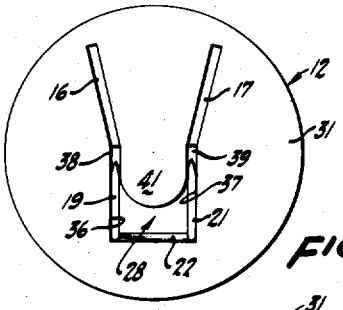
FIGURE 2 is a cross-sectional view, on an enlarged scale, of the fastener and is taken substantially on the plane of line 2—2 of FIGURE 1.
Figure 4:
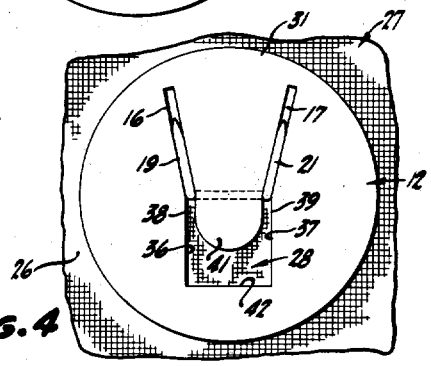
FIGURE 4 is a cross-sectional view on an enlarged scale of the fastener as taken substantially on the plane of line 4—4 of FIGURE 3.

The opening 28 may be of generally U-shape, having spaced substantially parallel sidewalls 36 and 37 adapted to receive and slidably confine therebetween the offset ends 19 and 21 of the wire section. The forward end of the opening 28 is preferably divided into a pair of spaced slots 38 and 39 which receive the ends [23] *19* and [24] *21* of the wire *section 11* and guide them into the bores 16 and 17. The slots may be formed by a rearwardly projecting *tongue shaped* [front wall] portion 41 which extends towards the rear wall 42 of the opening in spaced relation to the opposite sides 36 and 37, the rear wall 42 *of the opening* being spaced from the forward ends of the slots 38 and 39 *which define the front laterally extending end wall of the opening 28* by a distance permitting the offset ends 19 and 21 to be moved into and out of the opening perpendicularly to the side 18 without restriction, as illustrated in FIGURE 1. To fasten the sections together, the offset ends 19 and 21 are inserted into the opening and against the bottom side 43 thereof, as illustrated in FIGURE 2, and then the sections are displaced relative to each other so as to slide the ends 19 and 21 into the bores 16 and 17, as illustrated in FIGURES 3 and 4. The sections may be separated with equal facility by merely displacing them in an opposite direction to withdraw the end portions 19 and 21 [of] *from* the bores 16 and 17.

Figure 6:
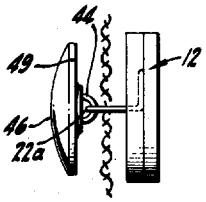
FIGURE 6 is a side elevation of a button and fastener combination.

The basic elements of the fastener, as above described, may be used in a wide variety of forms for accomplishing a wide variety of purposes. In its simplest form, the U-shaped wire section 11 and the fastener body section 12 combine to provide a simple form of pin similar to a safety pin. In this arrangement, the wire legs 13 and 14 may be inserted through one or more layers of fabric, as illustrated in FIGURES 3 and 4, with the *graspable handle* connecting portion 22 of the section 11 disposed on one side of the fabric and the section 12 disposed on the opposite side so as to secure the fastener in place and the one or more layers of fabric together. Also, as will be understood, the section 12 may be in the form of a button of either the functional or ornamental type or in the form of a piece of costume jewelry or other object which may be desirably detachably fastened on the outside of a garment or other supporting media through which the metal pin *section 11* may be inserted. On the other hand, the metal pin *section* itself may be used as a fastener for other objects. For example, it may be used as a corsage pin for receiving one or more stems of flowers or the like through the loop provided by the U-shaped form of the section, or the loop of the wire section may be passed through the loop or eyelet 44 of a conventional button 46, as illustrated in FIGURE 6, to provide an excellent button and fastener combination. In the latter case the connecting portion 22a of the wire is preferably rounded as shown in FIGURE 7 so as to center the button thereon.

Figure 5:
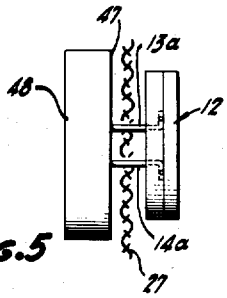
FIGURE 5 is a side elevation of a modified form of the fastener.

A modified form of the fastener is illustrated in FIGURE 5 of the drawing, wherein the wire legs 13a and 14a are carried by and project substantially perpendicularly from the normally back side 47 of a body section 48. The latter combines with the body section 12 in the manner above described to provide solid sections 48 and 12 on the opposite sides of a supporting media 27, such as one or more fabric layers. In this form of the invention, either the section 48 or the section 12 may be fashioned as a functional or ornamental button, jewelry piece or the like, with the other section functioning to properly support and present it at the opposite side of the garment. Also, this form of the invention makes possible the quick detachable mounting of an ornamental piece or the like to a companion section which is otherwise supported. For example, by attaching the section 12 to the outer side of a garment or the like, a plurality of interchangeable elements in the form of section 48 may be detachably applied to the section 12 as desired. In such case the legs 13a and 14a will be foreshortened so that the sections 12 and 48 will be assembled in face-to-face relation.

Figure 7:
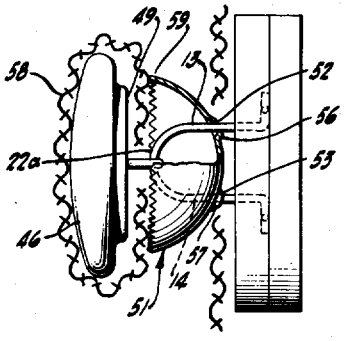
FIGURE 7 is a side elevation, partly in section, of a self-covered button and fastener combination.

In the form of the invention illustrated in FIGURE 7, the spaced wire legs 13 and 14 are extended from the back side 49 of a button 46, as for example in the manner illustrated in FIGURE 6, and a washer like member 51 is mounted on the legs 13 and 14 and positioned against the back side 49 of the button to provide a means for locking up the assembly. For this purpose the member 51 is formed with spaced openings 52 and 53 and the member is desirably formed with tongues 56 and 57 at the openings positioned to engage and grip the legs to secure the member against movement away from the back side of the button. This form of the invention is particularly useful in retaining on the button 46 a cloth or other covering 58 which may be extended over the face of the button and to the back side 49 thereof for engagement thereat by the member 51. For this purpose the member 51 is preferably of dish shape and is mounted on the legs 13 and 14 with the normally concave side of the member toward the rear side 49 of the button so as to present the rim 59 of the member 51 against the covering 58 at the back side of the button, and to better secure the covering in place, the rim 59 may be serrated as illustrated in FIGURE 7.

Figure 8:
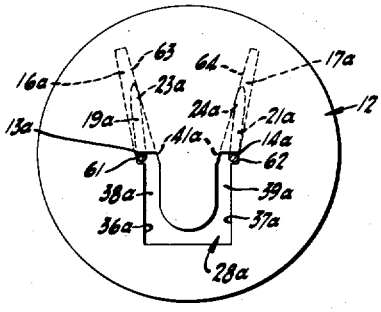
FIGURE 8 is a front elevation of a modified form of fastener section with the other fastener part shown in cross-section.

A further modified form of the invention is illustrated in FIGURE 8 wherein there is provided in the opening 28a *of body section 12* a pair of notches 61 and 62 which *extend generally laterally outwardly from side walls 36a and 37a respectively of the opening to* cooperate with the resilient strain placed upon the legs 13a and 14a to provide an automatic interlocking action upon sliding of the offset ends 19a and 21a into the *angularly related* divergent bores 16a and 17a.

As will be noted from FIGURE 8, the notches 61 and 62 are provided at the joinder of the opposite sidewalls 36a and 37a with the *laterally extending* front wall 41a of the opening *which is defined by the ends of slots 38a and 39a*—that is, *the notches preferably are located* at the forward extremities of the spaced slots 38a and 39a. Also, as will be noted, the bores 16a and 17a are tapered from the *front end* [inner] wall 41a so that the portion of the bores at the wall 41a is somewhat wider than at the inner ends of the bores. *That is, as shown in FIGURE 8, each of the bores is defined by opposing surfaces which converge relative to each other in the direction extending away from front end wall 41a so that the bores include inside guide surfaces 63 and 64 which are angularly related to their respective associated opening side walls 36a and 37a.* In this manner, the points 23a and 24a of the wire *pin section* will initially strike the adjacent inside diverging surfaces 63 and 64 and ride these surfaces as the *wire* pin *section* is pushed to attached position *in the bores,* thus crowding *and urging* the legs 13a and 14a *laterally* against the sidewalls 36a and 37a *as the end portions 19a and 21a are rotatively and tortionally twisted in the bores.* Accordingly, the legs will resiliently snap into the notches 61 and 62 *when the legs are moved adjacent front end wall 41a* upon attachment of the sections so as to thereby retain the sections against accidental separation. *That is, each leg of the pin section will become lockingly engaged in a notch and separably retained in such notch due to the lateral urging of such leg resulting from engagement of its associated point with the guide surface of its associated bore.*

Preferably, the form of the notch *employed on a side wall* is rounded or beveled sufficiently to permit displacement of the legs 13a and 14a out of the notches and onto the smooth sidewalls 36a and 37a when sufficient separating force is manually applied to the sections.

We claim:

1. A fastener comprising, detachable sections, one of said sections including a pair of spaced resilient wire legs secured at their ends against rotation about their axes and having opposite free ends offset in a common plane, and a second section formed with opposed side *walls* and *an* end [walls] *wall* defining an opening dimensioned to receive said free ends and being further formed with a pair of internal bores in the plane of said opening and divergently extending from said end wall at said side walls so as to constitute angular continuations of said side walls, said bores being dimensioned to slidably receive and to rotatively displace said free ends upon insertion of the latter into said bores so as to resiliently urge said legs against said side walls, said side walls being formed with lateral notches dimensioned to receive and interlock with said legs whereby the resilient stressing of said legs on said insertion will cause said legs to resiliently snap into said notches to detachably hold said sections together.

2. A fastener comprising, a substantially U-shaped wire of resilient material having spaced legs terminating in angularly extended substantially parallel free ends, and a fastener body formed with opposed side *walls* and *an* end [walls] *wall* defining an opening dimensioned to receive said free ends and being further formed with a pair of internal bores in the plane of said opening and divergently extending from said end wall at said side walls so as to constitute angular continuations of said side walls, said bores being dimensioned to slidably receive and to rotatively displace said free ends upon insertion of the latter into said bores so as to resiliently urge said legs against said side walls, said side walls being formed with lateral notches dimensioned to receive and interlock with said legs whereby the resilient stressing of said legs on said insertion will cause said legs to resiliently snap into said notches to detachably hold said wire and body together.

*3. A detachable fastener comprising a substantially U-shaped member of resilient material having spaced legs terminating in angularly extending free end portions, and a fastener body formed with an opening defined by opposed side walls and an end wall which is dimensioned to receive said free end portions, said body being further formed with a pair of internal bores divergently extending into said body from said end wall so as to constitute angular continuations of said side walls, said bores being dimensioned to slidably receive and to rotatively displace said free end portions upon insertion of the latter into said bores so as to resiliently urge said legs into engagement with said side walls, a side wall being formed with a lateral notch adjacent said end wall dimensioned to receive and interlock with the leg engaged with such side wall, whereby the resilient urging of said legs upon such insertion will cause such leg to resiliently snap into said notch to detachably hold said member and body together.*

*4. A detachable fastener comprising a substantially U-shaped member of resilient material having spaced legs terminating in angularly extending free end portions, and a fastener body formed with an opening defined by opposed side walls and an end wall which is dimensioned to receive said free end portions, said body being further formed with a pair of internal bores divergently extending into said body from said end wall so as to constitute angular continuations of said side walls, said bores being dimensioned to slidably receive and to rotatively displace said free end portions upon insertion of the latter into said bores so as to resiliently urge said legs into engagement with said side walls, and means for detachably locking said member in said body upon such insertion comprising notch structure adjacent said end wall extending laterally with respect to said side walls for interlocking with said member, whereby the resilient urging of said legs upon such insertion will cause said member to snap into engagement with said notch structure to detachably hold said member and said body together.*

*5. A two piece detachable fastener comprising a member including a pair of spaced resilient legs which terminate in free end portions each of which is angularly related to its associated leg, and a fastener body adapted to receive and interlock with said member, said body having an opening extending thereinto for receiving the end portions of the legs of said member, said opening being defined by a pair of opposed side walls each of which terminates at an end wall extending generally laterally of said side walls, said body having a pair of spaced bores therein which extend thereinto from the end wall of said opening, each bore including a guide surface which is angularly related relative to an associated side wall, said guide surfaces being angularly related relative to each other, said bores being adapted to slidably receive said free end portions of said legs with said end portions in engagement with said guide surfaces upon insertion of said member into said body, said guide surfaces upon such insertion resiliently urging said legs laterally against said side walls, a side wall having a laterally directed notch therein adjacent said end wall, said notch being adapted to receive and interlock with a leg of said member upon lateral urging of such leg during insertion of said end portions into said bores, whereby said member and said body may be detachably interlocked together.*

*6. A detachable fastener comprising a member including a pair of spaced resilient legs which terminate in free end portions each of which is angularly related to its associated leg, and a fastener body adapted to receive and interlock with said member, said body having an opening extending thereinto for receiving the end portions of the legs of said member, said opening being defined by a pair of opposed side walls each of which terminates at an end wall extending generally laterally of said side walls, said body having a pair of spaced bores therein which extend thereinto from the end wall of said opening, each bore including a guide surface which is angularly related relative to an associated side wall, said guide surfaces being angularly related relative to each other, said bores being adapted to slidably receive said free end portions of said legs with said end portions in engagement with said guide surfaces upon insertion of said member into said body, said guide surfaces upon such insertion resiliently urging said legs laterally against said side walls, and means for detachably locking said member in said body upon insertion of said end portions into said bores comprising notch structure adjacent said end wall extending laterally with respect to said side walls for interlocking with said member, whereby the resilient urging of said legs upon such insertion causes said member to snap into engagement with said notch structure to detachably hold said member and said body together.*

References Cited in the file of this patent or the original patent

| | | |
|---|---|---|
| 595,286 | Candel | Dec. 14, 1897 |
| 687,028 | Horning | Nov. 19, 1901 |
| 1,141,090 | Winn | May 25, 1915 |
| 1,221,009 | Abel | Apr. 3, 1917 |
| 1,519,487 | Cooney | Dec. 16, 1924 |
| 1,644,475 | Herman | Oct. 4, 1927 |

FOREIGN PATENTS

| | | |
|---|---|---|
| 16,401 | Great Britain | of 1912 |
| 51,215 | Germany | Mar. 15, 1890 |